United States Patent
Roberge

(10) Patent No.: US 10,883,380 B2
(45) Date of Patent: Jan. 5, 2021

(54) AIRFOIL DEICING SYSTEM

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 51 days.

(21) Appl. No.: 16/111,739

(22) Filed: Aug. 24, 2018

(65) Prior Publication Data

US 2020/0063600 A1    Feb. 27, 2020

(51) Int. Cl.
| F01D 25/02 | (2006.01) |
| F01D 21/12 | (2006.01) |
| G10K 9/18  | (2006.01) |

(52) U.S. Cl.
CPC ............ F01D 25/02 (2013.01); F01D 21/12 (2013.01); G10K 9/18 (2013.01); *F05D 2220/32* (2013.01)

(58) Field of Classification Search
CPC .......... F01D 25/02; F01D 21/12; F01D 21/14; G10K 9/18; B64C 1/067; F05D 2270/334; F03D 80/40
See application file for complete search history.

(56) References Cited

U.S. PATENT DOCUMENTS

| 8,292,579 | B2 | 10/2012 | Magnuson |
| 8,733,688 | B2 | 5/2014 | Gantie |
| 9,777,591 | B2* | 10/2017 | Tine .................. F01D 21/003 |
| 9,821,915 | B2 | 11/2017 | Giles et al. |
| 2011/0280723 | A1 | 11/2011 | Libergren |
| 2016/0230588 | A1* | 8/2016 | Tine .................. G01H 13/00 |
| 2017/0361936 | A1* | 12/2017 | Hull .................. B64D 15/22 |

FOREIGN PATENT DOCUMENTS

| DE | 102017119870 A1 | 2/2019 | |
| FR | 2998921 A1 * | 6/2014 | ............. B64D 15/16 |
| WO | 2014209665 A1 | 12/2014 | |

OTHER PUBLICATIONS

European Search Report for Application No. EP 19 19 2155.
English Machine Translation for Abstract DE102017119870.

* cited by examiner

*Primary Examiner* — Nathaniel E Wiehe
*Assistant Examiner* — Danielle M. Christensen
(74) *Attorney, Agent, or Firm* — Cantor Colburn LLP

(57) ABSTRACT

A gas turbine engine includes an airfoil and a deicing system. The airfoil radially extends from a hub towards a case disposed about a central longitudinal axis of the gas turbine engine. The deicing system includes an acoustic driver assembly arranged to apply acoustic energy to the airfoil to excite a predetermined vibratory mode of the airfoil.

19 Claims, 4 Drawing Sheets

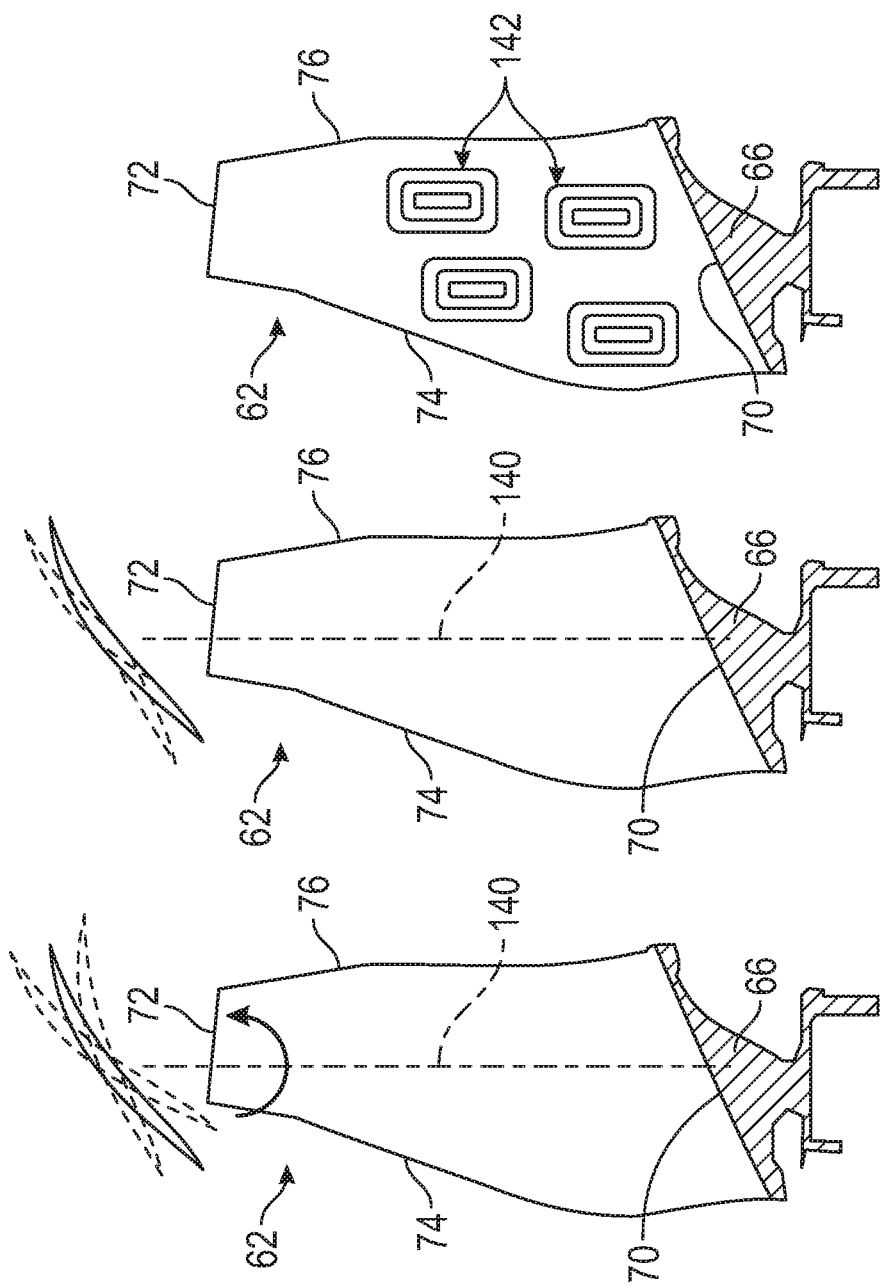

AIRFOIL DEICING SYSTEM

BACKGROUND

Exemplary embodiments of the present disclosure pertain to the art of gas turbine engines.

Gas turbine engines may operate in known icing conditions that may cause ice to accrete on rotating airfoils or other surfaces of the gas turbine engine. In some situations, a controlled increase of the gas turbine engine rotor speed may cause ice to shed from the airfoils or other surfaces. The shedding of the ice may result in imbalances generated by differing airfoil ice mass and/or ice mass distribution that is a function of radial location on the airfoil. The imbalance resulting from the asymmetric ice shedding may result in passenger discomfort, perceived noise, or engine or cabin vibration.

BRIEF DESCRIPTION

Disclosed is a deicing system for a gas turbine engine having a central longitudinal axis. The deicing system includes an acoustic driver that is arranged to apply acoustic energy to an airfoil to excite a predetermined vibratory mode of the airfoil. The acoustic driver is spaced apart from the airfoil.

In addition to one or more of the features described above, or as an alternative to any of the foregoing embodiments, the acoustic driver is disposed on a case that is disposed about the airfoil.

In addition to one or more of the features described above, or as an alternative to any of the foregoing embodiments, the acoustic driver is disposed on an engine structure disposed aft of the airfoil.

In addition to one or more of the features described above, or as an alternative to any of the foregoing embodiments, a vibration sensor disposed on a case of the gas turbine engine that is disposed about the airfoil. The vibration sensor is arranged to provide a signal indicative of a vibratory signature of the airfoil.

In addition to one or more of the features described above, or as an alternative to any of the foregoing embodiments, a controller in communication with the acoustic driver and is arranged to receive the signal.

In addition to one or more of the features described above, or as an alternative to any of the foregoing embodiments, the controller is programmed to, responsive to the signal being indicative of the vibratory signature of the airfoil being greater than a threshold, command the acoustic driver to apply acoustic energy to the airfoil.

In addition to one or more of the features described above, or as an alternative to any of the foregoing embodiments, a plurality of openings defined in a hub. The plurality of openings being arranged to receive bleed air from a core engine and direct the bleed air towards a base of the airfoil.

In addition to one or more of the features described above, or as an alternative to any of the foregoing embodiments, an ice detection sensor disposed on at least one of a case and an engine structure. The ice detection sensor is arranged to provide a signal indicative of ice formation on the airfoil.

In addition to one or more of the features described above, or as an alternative to any of the foregoing embodiments, a controller in communication with the acoustic driver and is arranged to receive the signal.

In addition to one or more of the features described above, or as an alternative to any of the foregoing embodiments, the controller is programmed to, responsive to the signal being indicative of ice formation on the airfoil, command the acoustic driver to apply acoustic energy to the airfoil.

In addition to one or more of the features described above, or as an alternative to any of the foregoing embodiments, a controller in communication with the acoustic driver.

In addition to one or more of the features described above, or as an alternative to any of the foregoing embodiments, the controller is programmed to, responsive to a request to de-ice the airfoil, command the acoustic driver to apply acoustic energy to the airfoil.

Also disclosed is a gas turbine engine that includes an airfoil and a deicing system. The airfoil radially extends from a hub towards a case disposed about a central longitudinal axis of the gas turbine engine. The deicing system includes an acoustic driver assembly arranged to apply acoustic energy to the airfoil to excite a predetermined vibratory mode of the airfoil.

In addition to one or more of the features described above, or as an alternative to any of the foregoing embodiments, a first acoustic driver extending through the case and disposed proximate at least one of a leading edge and a tip of the airfoil.

In addition to one or more of the features described above, or as an alternative to any of the foregoing embodiments, a second acoustic driver spaced apart from the first acoustic driver. The second acoustic driver extending through the case and disposed proximate at least one of a trailing edge and a tip of the airfoil.

In addition to one or more of the features described above, or as an alternative to any of the foregoing embodiments, a vibration sensor arranged to provide a signal indicative of a vibratory signature of the airfoil; and a controller in communication with at least one of the first acoustic driver and the second acoustic driver and is arranged to receive the signal. The controller programmed to, responsive to the signal being indicative of the vibratory signature of the airfoil being greater than a threshold, command at least one of the first acoustic driver and the second acoustic driver to apply acoustic energy to the airfoil.

In addition to one or more of the features described above, or as an alternative to any of the foregoing embodiments, a temperature sensor arranged to provide a signal indicative of a temperature proximate the airfoil; and a controller in communication with at least one of the first acoustic driver and the second acoustic driver and is arranged to receive the signal. The controller programmed to, responsive to the signal being indicative of a temperature less than a threshold, command at least one of the first acoustic driver and the second acoustic driver to apply acoustic energy to the airfoil.

In addition to one or more of the features described above, or as an alternative to any of the foregoing embodiments, an ice detection sensor arranged to provide a signal indicative of ice formation on the airfoil; and a controller in communication with at least one of the first acoustic driver and the second acoustic driver and is arranged to receive the signal. The controller programmed to, responsive to the signal being indicative of ice formation on the airfoil, command at least one of the first acoustic driver and the second acoustic driver to apply acoustic energy to the airfoil.

Further disclosed is a method of deicing an airfoil of a gas turbine engine. The method includes applying acoustic energy to an airfoil via an acoustic driver. The acoustic driver being spaced apart from the airfoil. The acoustic energy excites a predetermined vibratory mode of the airfoil.

In addition to one or more of the features described above, or as an alternative to any of the foregoing embodiments, the acoustic energy is applied to the airfoil responsive to a vibratory signature of the airfoil being greater than a threshold.

BRIEF DESCRIPTION OF THE DRAWINGS

The following descriptions should not be considered limiting in any way. With reference to the accompanying drawings, like elements are numbered alike:

FIGS. 4A-4C are views of exemplary vibratory response modes of the airfoil.

DETAILED DESCRIPTION

A detailed description of one or more embodiments of the disclosed apparatus and method are presented herein by way of exemplification and not limitation with reference to the Figures.

Figure 1:
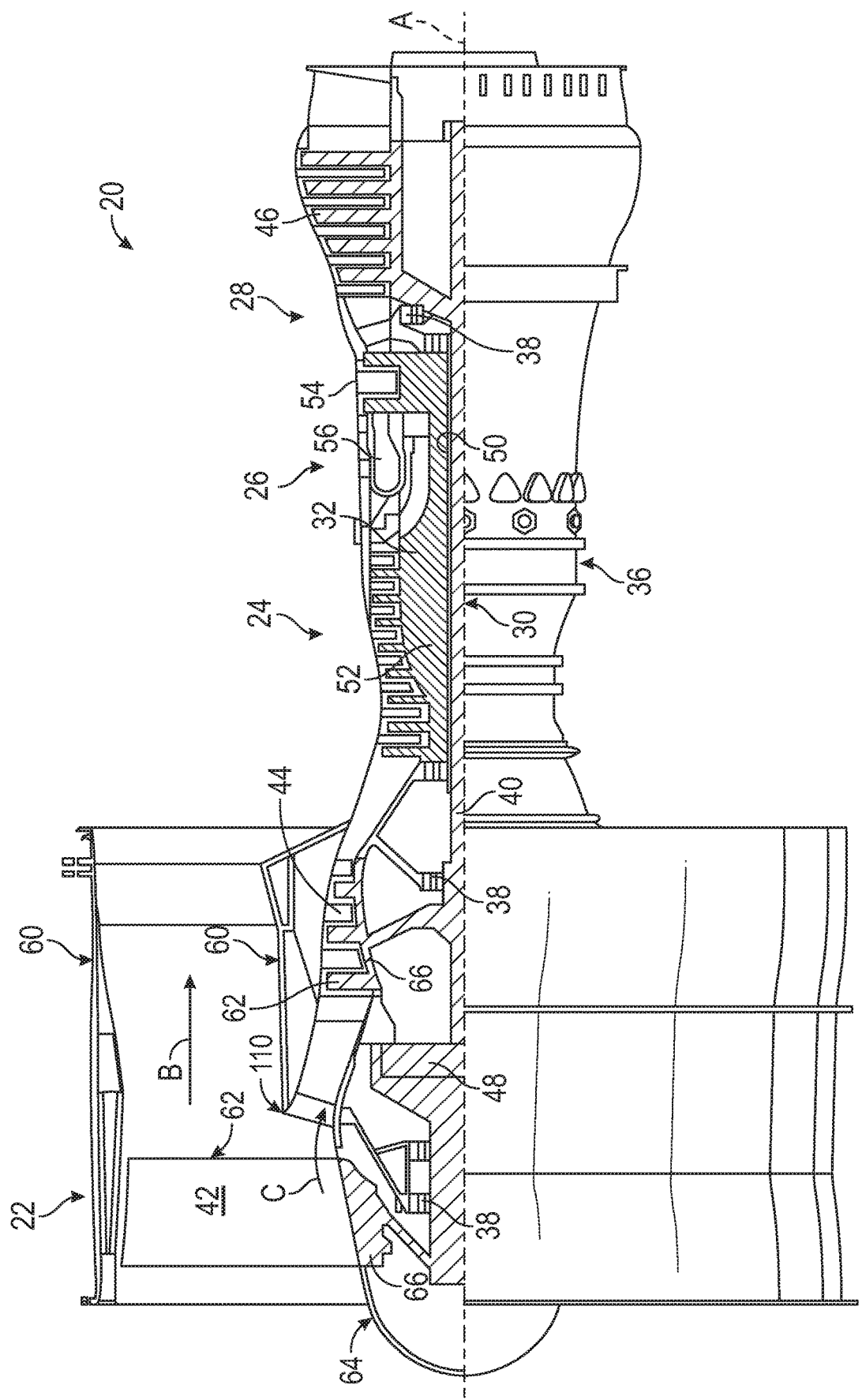
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
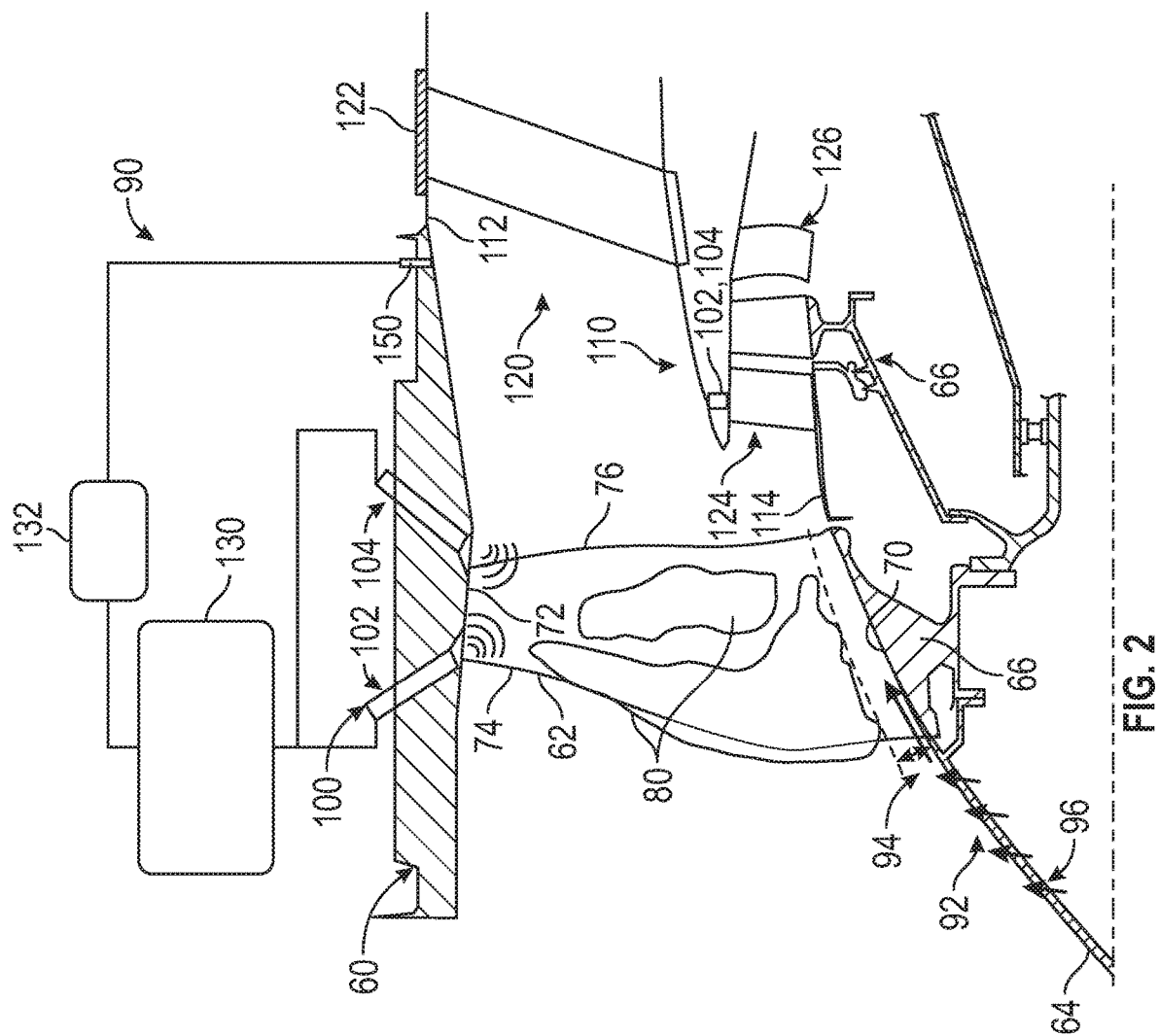
FIG. 2 is a portion of the gas turbine engine having a deicing system, illustrating ice formation on an airfoil.
Figure 3:
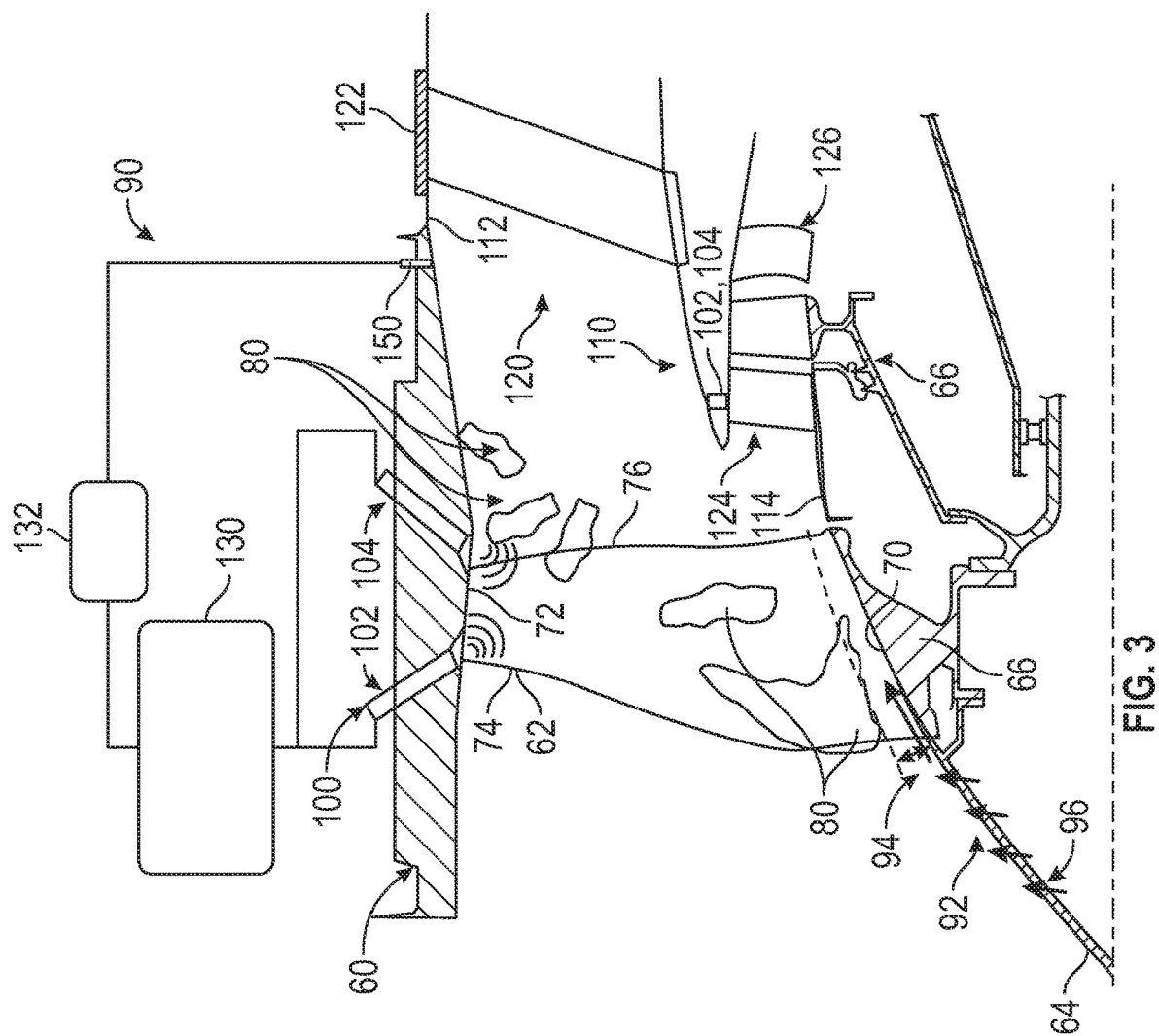
FIG. 3 is a portion of the gas turbine engine having the deicing system, showing the deicing system facilitating the liberation of ice from the airfoil.

Referring to FIGS. 1-3, a case 60 may be provided with at least one of the fan section 22 of the compressor section 24. The case 60 is disposed about the central longitudinal axis A and is disposed about an airfoil 62 that radially extends from a nose cone/spinner 64 or a hub 66. The nose cone/spinner 64 or the hub 66 is rotatable about the central longitudinal axis A.

Referring to FIGS. 2 and 3, the airfoil 62 is shown as being part of the fan 42 of the gas turbine engine 20, however the airfoil 62 may be provided with the compressor section 24.

Referring to FIGS. 2 and 3, the airfoil 62 radially extends between a base 70 and a tip 72 and extends towards an inner surface of the case 60, relative to the central longitudinal axis A. The base 70 is operatively connected to or may be integrally formed with a nose cone/spinner 64, should the airfoil 62 be provided with the fan section 22. The base 70 is operatively connected to or may be integrally formed with a rotor/hub 66, should the airfoil 62 be provided with the compressor section 24. The tip 72 is disposed proximate an inner surface of the case 60. The airfoil 62 axially extends between a leading edge 74 and a trailing edge 76, relative to the central longitudinal axis A. The leading edge 74 and the trailing edge 76 are disposed opposite each other and each radially extends between the base 70 and the tip 72.

Referring to FIGS. 2 and 3, ice or an ice formation 80 may form or accrete on a surface of the airfoil 62 while operating in icing conditions. The icing conditions may be present when an ambient temperature proximate the airfoil 62 is less than a threshold temperature. Ice may form or accrete on a surface of the airfoil 62 when the gas turbine engine 20 is operating in the above identified conditions should the surface temperature of the airfoil 62 be below a threshold temperature.

A deicing system 90 may be provided to facilitate the periodic or controlled shedding of the ice or ice formation 80 from the airfoil 62 to avoid the perceived noise or vibration from asymmetric shedding. The deicing system 90 may externally apply acoustic energy to excite predetermined vibratory modes or vibratory response modes of the airfoil 62 to cause the controlled shedding of the ice or ice formation 80 from the airfoil 62, as shown in FIG. 3. In at least one embodiment, the deicing system 90 may also apply bleed air or warm air 92 from the core engine to the base 70 of the airfoil 62 to provide a zone 94 of minimal ice formation or minimal ice adhesion. The nose cone/spinner 64 defines a plurality of openings 96 that are arranged to receive the bleed air or warm air 92 and direct the bleed air or warm air 92 towards the base 70 of the airfoil 62.

The deicing system 90 includes an acoustic driver assembly 100 that is arranged to apply acoustic energy to the airfoil 62 to excite a predetermined vibratory response mode of the airfoil 62 such that the vibratory response of the airfoil 62 liberates the ice or ice formation 80 from the airfoil 62. The acoustic driver assembly 100 is spaced apart from and does not engage the airfoil 62.

The acoustic driver assembly 100 includes at least one of a first acoustic driver 102 or a second acoustic driver 104. In some embodiments, only one acoustic driver may be provided, while in other embodiments, a plurality of acoustic driver assemblies may be provided that are circumferentially distributed about the central longitudinal axis A, circumferentially and/or axially spaced apart from each other and face towards the airfoil 62. The circumferential and/or axial spacing apart of the acoustic drivers from each other is selected to assist in driving specific frequencies in the airfoil 62. At least one of the first acoustic driver 102 and the second acoustic driver 104 is a speaker, an air pulse device, a device arranged to provide an aerodynamic discontinuity, or the like.

The rotation of the airfoil 62 about the central longitudinal axis A during engine operation will result in a given airfoil 62 approaching and retreating from an acoustic driver of the acoustic driver assembly 100.

At least one of the first acoustic driver 102 or the second acoustic driver 104 of the acoustic driver assembly 100 may be disposed on an engine structure 110 that is disposed aft of the airfoil 62. The engine structure 110 may be a splitter that is disposed between an outer flow path wall 112 defined by the case 60 and an inner flow path wall 114. A bypass duct 120 is defined between the outer flow path wall 112 and a first surface of the engine structure 110. An exit guide vane 122 extends through the outer flow path wall 112 and extends to the first surface of the engine structure 110. A core flow duct or compressor duct 124 is defined between the inner flow path wall 114 and a second surface of the engine structure 110 that is disposed opposite the first surface of the engine structure 110. A blade row 126 that may contain the airfoil 62 may be disposed within the compressor duct 124.

Should at least one of the first acoustic driver 102 or the second acoustic driver 104 be disposed on the engine structure 110, at least one of the first acoustic driver 102 or the second acoustic driver 104 faces towards the trailing edge 76 of the airfoil 62. At least one of the first acoustic driver 102 or the second acoustic driver 104 in such an arrangement is disposed closer to the base 70 than the tip 72 of the airfoil 62.

At least one of the first acoustic driver 102 or the second acoustic driver 104 of the acoustic driver assembly 100 may be disposed on or extend through an inner surface of the case 60 and face towards the airfoil 62. The first acoustic driver 102 extends through the inner surface of the case 60 and is disposed proximate at least one of the leading edge 74 and the tip 72 of the airfoil 62. The second acoustic driver 104 is spaced apart from the first acoustic driver 102. The second acoustic driver 104 extends through the inner surface of the case 60 and is disposed proximate at least one of the trailing edge 76 and the tip 72 of the airfoil 62.

At least one of the first acoustic driver 102 or the second acoustic driver 104 is in communication with or powered by power supply or frequency generator 130 that is in communication with a controller 132. The power supply or frequency generator 130 and/or the controller 132 is arranged to provide an input to at least one of the first acoustic driver 102 and the second acoustic driver 104 to provide a predetermined excitation frequency or acoustic energy of a known airfoil vibratory response for ice shedding while avoiding other modes that may adversely impact the airfoil 62. The predetermined excitation frequency or acoustic energy may be based on the known vibratory response of the airfoil 62 and a rotational speed of the gas turbine engine 20. The phase of acoustic energy delivered by the frequency generator 130 and/or the controller 132 may be tailored between at least one of the first acoustic driver 102 or the second acoustic driver 104, as well as additional acoustic drivers, to generate the desired vibratory response.

The preferred excitation frequency or acoustic energy may be a pulse or continuous provision of a single frequency or range of frequencies provided in a time controlled manner that is arranged to excite the airfoil 62 to promote airfoil motion and ice shedding through differential motion/strain, as shown in FIGS. 4A-4C. The differential motion/strain may be a torsional or twisting motion/mode of the airfoil 62 about a radial axis 140 along which the airfoil 62 extends, as shown in FIG. 4A. The differential motion/strain may be a bending mode of the airfoil 62 relative to the radial axis 140 along which the airfoil 62 extends, as shown in FIG. 4B. The differential motion/strain may be a complex mode having various zones of isolated motion 142 of the airfoil 62, as shown in FIG. 4C. Other modes are also contemplated.

The process of induced vibratory modes through acoustic energy being applied to the airfoil 62 through the acoustic driver assembly 100 may be repeated or cycled on a periodic basis to limit the amount (e.g. surface area and/or thickness) of ice adhesion or ice formation 80 and accompanying imbalance as the ice formation 80 is shed from the airfoil 62. The shedding of the ice or ice formation 80 more frequently inhibits the imbalance created by asymmetric ice shedding.

The process of ice shedding from the airfoil 62 may be based on a signal provided by one or more sensors 150 that are in communication with the controller 132. The sensor 150 may be disposed on at least one of the case 60 or the engine structure 110. The sensor 150 may be a vibration sensor, an ice detection sensor, and/or a temperature sensor.

The vibration sensor is arranged to provide a signal indicative of a vibratory signature of the gas turbine engine rotor system including the airfoil 62 and rotation about the central longitudinal axis A. The vibratory signature may be a result of the imbalanced ice or ice formation 80 on the airfoil 62 leading to vibrations and perceived noise. The controller 132 is programmed to command at least one of the first acoustic driver 102 and the second acoustic driver 104 to apply acoustic energy to the airfoil 62, to excite a vibratory response mode in the airfoil 62 that sheds the ice or ice formation 80 from the airfoil 62, responsive to the signal indicative of the vibratory signature the airfoil being indicative of the vibratory signature being greater than a threshold.

The ice detection sensor is arranged to provide a signal indicative of the ice or ice formation 80 being present on the airfoil 62. The controller 132 is programmed to command at least one of the first acoustic driver 102 and the second acoustic driver 104 to apply acoustic energy to the airfoil 62, to excite a vibratory response mode in the airfoil 62 that sheds the ice or ice formation 80 from the airfoil 62, responsive to the signal being indicative of the ice or ice formation 80 on the airfoil 62 being greater than a threshold.

The temperature sensor is arranged to provide a signal indicative of the temperature proximate or of the airfoil 62. The controller 132 is programmed to command at least one of the first acoustic driver 102 and the second acoustic driver 104 to apply acoustic energy to the airfoil 62, to excite a vibratory response mode in the airfoil 62 that sheds the ice or ice formation 80 from the airfoil 62, responsive to the signal being indicative of the temperature being less than a threshold temperature.

In at least one embodiment, the operator of the aircraft incorporating the gas turbine engine 20 having the deicing system 90 may provide a request to the controller 132 to deice the airfoil 62. The controller 132 is programmed to command at least one of the first acoustic driver 102 and the second acoustic driver 104 to apply acoustic energy to the airfoil 62, to excite a vibratory response mode in the airfoil 62 that sheds the ice or ice formation 80 from the airfoil 62, responsive to the controller 132 receiving the request.

The deicing system 90 enables ice or ice formations 80 to be shed from the airfoil 62 more frequently as compared to other deicing methods. The deicing system 90 also reduces imbalances due to the asymmetric shedding of the ice or ice formation 80.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A deicing system for a gas turbine engine, comprising:
    an acoustic driver that is arranged to apply acoustic energy to an airfoil to excite a predetermined vibratory mode of the airfoil, the acoustic driver being spaced apart from the airfoil and secured to an engine structure.

2. The deicing system as in claim 1, wherein the acoustic driver is disposed aft of the airfoil.

3. The deicing system of claim 1, wherein the deicing system further comprises: a plurality of openings defined in a hub, the plurality of openings being arranged to receive bleed air from a core engine and direct the bleed air towards a base of the airfoil.

4. A deicing system for a gas turbine engine having a central longitudinal axis, the deicing system comprising:
    an acoustic driver that is arranged to apply acoustic energy to an airfoil to excite a predetermined vibratory mode of the airfoil, the acoustic driver being spaced apart from the airfoil; and
    a vibration sensor arranged to provide a signal indicative of a vibratory signature of the airfoil, the vibration sensor being disposed on a case of the gas turbine engine that is disposed about the airfoil.

5. The deicing system of claim 4, wherein the deicing system further comprises:
    a controller in communication with the acoustic driver and is arranged to receive the signal.

6. The deicing system of claim 5, wherein the controller is programmed to, responsive to the signal being indicative of the vibratory signature of the airfoil being greater than a threshold, command the acoustic driver to apply acoustic energy to the airfoil.

7. The deicing system of claim 4, wherein the acoustic driver is aft of the airfoil.

8. A deicing system for a gas turbine engine having a central longitudinal axis, the deicing system comprising:
    an acoustic driver that is arranged to apply acoustic energy to an airfoil to excite a predetermined vibratory mode of the airfoil, the acoustic driver being spaced apart from the airfoil; and
    an ice detection sensor disposed on at least one of a case and an engine structure, the ice detection sensor arranged to provide a signal indicative of ice formation on the airfoil.

9. The deicing system of claim 8, wherein the acoustic driver is disposed on a case that is disposed about the airfoil.

10. The deicing system of claim 8, wherein the deicing system further comprises:

a controller in communication with the acoustic driver and arranged to receive the signal.

11. The deicing system of claim 10, wherein the controller is programmed to, responsive to the signal being indicative of ice formation on the airfoil, command the acoustic driver to apply acoustic energy to the airfoil.

12. A deicing system for a gas turbine engine having a central longitudinal axis, the deicing system comprising:
an acoustic driver that is arranged to apply acoustic energy to an airfoil to excite a predetermined vibratory mode of the airfoil, the acoustic driver being spaced apart from the airfoil; and
a controller in communication with the acoustic driver, wherein the controller is programmed to, responsive to a request to de-ice the airfoil, command the acoustic driver to apply acoustic energy to the airfoil.

13. A gas turbine engine, comprising:
an airfoil radially extending from a hub towards a case disposed about a central longitudinal axis of the gas turbine engine; and
a deicing system, comprising:
an acoustic driver assembly arranged to apply acoustic energy to the airfoil to excite a predetermined vibratory mode of the airfoil.

14. The gas turbine engine of claim 13, wherein the acoustic driver assembly comprises:
a first acoustic driver extending through the case and disposed proximate at least one of a leading edge and a tip of the airfoil.

15. The gas turbine engine of claim 14, wherein the acoustic driver assembly comprises:
a second acoustic driver spaced apart from the first acoustic driver, the second acoustic driver extending through the case and disposed proximate at least one of a trailing edge and a tip of the airfoil.

16. The gas turbine engine of claim 15, wherein the deicing system further comprises:
a vibration sensor arranged to provide a signal indicative of a vibratory signature of the airfoil; and a controller in communication with at least one of the first acoustic driver and the second acoustic driver and is arranged to receive the signal, the controller programmed to, responsive to the signal being indicative of the vibratory signature of the airfoil being greater than a threshold, command at least one of the first acoustic driver and the second acoustic driver to apply acoustic energy to the airfoil.

17. The gas turbine engine of claim 15, wherein the deicing system further comprises:
a temperature sensor arranged to provide a signal indicative of a temperature proximate the airfoil; and
a controller in communication with at least one of the first acoustic driver and the second acoustic driver and is arranged to receive the signal, the controller programmed to, responsive to the signal being indicative of a temperature less than a threshold, command at least one of the first acoustic driver and the second acoustic driver to apply acoustic energy to the airfoil.

18. The gas turbine engine of claim 15, wherein the deicing system further comprises:
an ice detection sensor arranged to provide a signal indicative of ice formation on the airfoil; and
a controller in communication with at least one of the first acoustic driver and the second acoustic driver and is arranged to receive the signal, the controller programmed to, responsive to the signal being indicative of ice formation on the airfoil, command at least one of the first acoustic driver and the second acoustic driver to apply acoustic energy to the airfoil.

19. A method of deicing an airfoil of a gas turbine engine, comprising:
applying acoustic energy to an airfoil via an acoustic driver that is spaced apart from the airfoil, wherein the acoustic energy excites a predetermined vibratory mode of the airfoil, wherein the acoustic energy is applied to the airfoil in response to a vibratory signature of the airfoil that is greater than a threshold.

* * * * *